3,012,059
FUSION PROCESS FOR PRODUCING PURE
ORGANIC NITRILES
Irving I. Bezman, Pittsburgh, Pa., assignor to Armstrong Cork Company, Lancaster, Pa., a corporation of Pennsylvania
No Drawing. Filed May 18, 1959, Ser. No. 813,625
6 Claims. (Cl. 260—465)

This invention relates generally to the production of organic nitriles and more particularly to the production of organic nitriles by means of an anhydrous fusion process utilizing phosphonitrilic chloride.

The invention contemplates admixing under anhydrous conditions a phosphonitrilic chloride and an alkali metal salt or alkaline earth metal salt of a fatty acid or an aromatic carboxylic acid. The mixture is heated under anhydrous conditions to a temperature in the range of 100°–200° C. The resulting organic nitrile is then recovered from the reaction mixture.

It is apparent from the above description that the present process contemplates a fusion of dry reactants. The first of these reactants is a phosphonitrilic chloride in the form of its trimer, tetramer, or any of the usual polymers possessing the formula $(PNCl_2)_n$, or mixtures thereof, where $n$ is a whole number from 1 to 7. The phosphonitrilic chloride preferred for use in the present invention will generally be the trimer melting at 114° C., but this preference is based generally on availability and ease of handling. The tetramer, wherein $n$ equals 4 in the above formula, melts at 123.5° C. Mixtures of the trimer and tetramer (which form euctectics melting at lower temperatures) are also suitable. The amount of the phosphonitrilic chloride to be used will be that amount which supplies one atom of nitrogen per three molecules of organic acid salt to be admixed with the phosphonitrilic chloride.

The second reactant in the present process is an organic acid. The organic acid may be a fatty acid containing 2–18 carbon atoms having the formula $C_nH_{2n+1}COOH$ wherein $n$ is a numeral from 1–17; acids from acetic to stearic are suitable. The final product, the nitrile, will be the nitrile which corresponds to the starting acid. If one starts with an alkali metal salt of acetic acid, one will produce acetonitrile. If one starts with the alkali metal salt of lauric acid, one produces lauronitrile.

The organic acid may also be an aromatic acid containing a single benzene ring such as benzoic acid, and the ring-substituted benzoic acids. Here, too, one atom of nitrogen will be needed for every three atoms of the starting organic acid.

Along with the nitrile there will be produced the anhydride, the metaphosphate, and the alkali metal salt of chlorine. Accordingly, the over-all reaction may be written:

$(PNCl_2)_3 + 9ACOOMe \rightarrow 3ACN + 3(ACO)_2O + 3MePO_3 + 6MeCl$ where the trimer is used and where A is the monovalent hydrocarbon or substituted hydrocarbon radical of the selected acid, and Me is the alkali metal.

Although nitriles can be obtained using the starting materials in a 1:1 mole ratio, it is preferred to use them in a 1:9 mole ratio in accord with the equation given above. If the ratio of carboxylic acid salt to phosphonitrilic chloride is lowered, the yield of nitrile obtained is lowered correspondingly and by-products such as the corresponding acid chlorides are formed.

The dry mixture of the phosphonitrilic chloride and the alkali metal or alkaline earth metal carboxylic acid salt must be heated to a temperature in the range of 100°–200° C. to initiate the reaction. Most generally, the reaction will begin when one of the two reactants becomes liquefied by means of heat. Frequently the phosphonitrilic chloride will be the first to liquefy when the temperature of the reaction mixture reaches 114° C. From that point on the reaction is generally mildly exothermic. To insure the reaction has gone to completion the temperature will generally be raised to 150° C., and may go as high as 200° C. Where the higher temperatures are used it is preferred that a reflux condenser be fitted to the reaction container in order to return reactants to the reaction medium.

The preferred temperature of reaction will be between 110°–150° C. The general rule for conducting the reaction is simply to increase the temperature to form a melt whereupon the exothermic reaction takes over. On cooling, the organic nitrile product can be separated.

Separation of the organic nitrile product is easily accomplished to recover the product in exceedingly pure form. In fact this is one of the advantages of the present invention. Where a low molecular weight nitrile is produced, it may be distilled off by warming the reaction mixture under reduced pressure. Where higher molecular weight nitriles are produced, they may be recovered by solvent extraction, generally with non-polar solvents, particularly chloroform. Redistillation or careful washing of solvents will produce the desired organic nitrile in great purity. As mentioned above, the simplicity of purification is one of the advantages of the present process. Other advantages are the ease of carrying out the reaction to produce the desired nitrile, and the short period of time necessary for the reaction to go to completion. Any of the defined nitriles can easily be produced within one-half hour's time of forming the dry mixture of phosphonitrilic chloride and acid salt.

The following examples illustrate several embodiments of the invention. All parts are by weight unless otherwise stated.

*Example 1*

Sodium acetate was dried for three hours at a temperature of 120°–130° C. 10.8 parts (0.1318 mole) of the dried sodium acetate was admixed in a flask with 6.96 parts (0.02 mole) of the trimer of phosphonitrilic chloride $(PNCl_2)_3$. The two ingredients were thoroughly admixed at room temperature. No signs of any reaction were noted. By means of an oil bath, the flask, equipped with a reflux condenser, was warmed to a reaction mixture temperature of 114° C., whereupon the oil bath was removed. The temperature of the reaction mixture slowly rose to 150° C. over a period of 20 minutes. When the temperature began to fall, reduced pressure distillation of the reaction mixture gave a water-white liquid which was identified as acetonitrile by infrared spectroscopic examination.

*Example 2*

As in Example 1, sodium laurate was dried and then admixed in a flask in an amount of 14.6 parts (0.0658 mole) with 3.48 parts (0.01 mole) triphosphonitrilic chloride.

Signs of reaction were visible in the reaction mixture on heating to 118°–120° C. The maximum temperature reached by the exothermic reaction was 150° C.

The lauronitrile was extracted with carbon tetrachloride and purified by evaporation and washing with additional carbon tetrachloride. The resulting yellow liquid was identified as lauronitrile by infrared spectroscopic examination.

*Example 3*

The sodium salt of anisic acid

was dried overnight at 120°–130° C. Into a flask were placed 11.49 parts (0.0633 mole) of the sodium anisate and 3.48 parts (0.01 mole) triphosphonitrilic chloride. The exothermic reaction took over at 117°–120° C. and the temperature rose to 150° C. On extraction with carbon tetrachloride followed by subsequent purification, a yellow solid was obtained and identified as anisonitrile by infrared spectroscopic examination.

*Example 4*

Into a flask was placed 11.78 parts (0.0660 mole) of sodium p-chlorobenzoate dried in the usual fashion along with 3.48 parts (0.01 mole) triphosphonitrilic chloride. The exothermic reaction was initiated at 147° C. and was completed at 150° C. The white crystals of p-chlorobenzonitrile were removed from the reaction mixture by sublimation.

*Example 5*

Into a 250 ml. round-bottom flask fitted with a condenser, drying tube, and liquid nitrogen trap, was placed a mixture of 50 parts (0.347 mole) of sodium benzoate which had been previously dried to constant weight at 105° and 13.35 parts (0.0384 mole) of triphosphonitrilic chloride. The mixture was ground together intimately in a dry atmosphere before being placed in the flask. A thermometer was inserted in the reaction mixture through the condenser, and the flask was heated by an electric mantle containing a thermocouple for temperature measurement. The heater temperature was increased slowly to about 115° in 45 minutes. At this point, signs of melting were noted around the inner surface of the flask and the temperature of the center of the reaction mixture, which had been about 60°, increased to 240° in about 5 minutes. Heating was discontinued at this point, and the temperature of the reaction mixture began to decrease after an additional 5 minutes, indicating that the entire reaction took place in about 10 minutes from the time the first signs of melting were detected. The reaction products were treated with carbon tetrachloride, insoluble material was filtered off, and the remaining solution was distilled at atmospheric pressure to remove the carbon tetrachloride; the residual solution was transferred to a smaller still pot and then distilled at 1–2 mm. pressure at 35° to give benzonitrile, $N_D^{22}$ 1.5282, literature value $N_D^{20}$ 1.5289, and further confirmed as benzonitrile by infrared spectroscopic examination. The yield was approximately 70% of theoretical.

I claim:

1. The process of preparing an organic acid nitrile which comprises admixing under anhydrous conditions a phosphonitrilic chloride and an alkali metal salt of an organic acid selected from the group consisting of a saturated fatty acid having the formula $C_nH_{2n+1}COOH$ wherein $n$ is a numeral from 1–17, benzoic acid and a ring substituted benzoic acid, heating the resulting mixture under anhydrous conditions to a temperature in the range of 100°–200° C., and recovering from the mixture the organic nitrile corresponding to said organic acid.

2. A process according to claim 1 wherein said temperature is in the range of 114°–150° C.

3. A process according to claim 1 wherein said phosphonitrilic chloride is in the form $(PNCl_2)_3$.

4. A process according to claim 1 wherein said alkali metal is sodium.

5. A process according to claim 1 wherein said recovery is accomplished by distillation.

6. The process according to claim 1 wherein said recovery is accomplished by solvent extraction.

References Cited in the file of this patent
FOREIGN PATENTS 767,979   Great Britain _____ Feb. 13, 1957

OTHER REFERENCES

Markley: Fatty Acids, 1947, page 16.